United States Patent

Gleim et al.

[11] Patent Number: 5,856,751
[45] Date of Patent: Jan. 5, 1999

[54] METHOD AND APPARATUS FOR MONITORING AN ALTERNATING SIGNAL

[75] Inventors: Günter Gleim; Hermann Link; Friedrich Heizmann, all of Villingen-Schwenningen, Germany

[73] Assignee: Deutsche Thomson-Brandt GmbH, Villinger-Schwenningen, Germany

[21] Appl. No.: 123,920

[22] Filed: Sep. 20, 1993

[30] Foreign Application Priority Data

Sep. 21, 1992 [DE] Germany ............... 42 31 611.1

[51] Int. Cl.$^6$ ................................................ H03K 5/153
[52] U.S. Cl. ........................... 327/74; 327/74; 327/76; 327/175
[58] Field of Search ............... 307/360, 361, 307/355, 356, 357, 234; 328/111, 112; 327/58, 60, 62, 72, 74, 75, 76, 171, 172, 175, 176

[56] References Cited

U.S. PATENT DOCUMENTS

| | | | |
|---|---|---|---|
| 3,579,125 | 5/1971 | Lindblad | 307/360 |
| 3,725,795 | 4/1973 | Mesenhimer | 307/360 |
| 4,011,507 | 3/1977 | Rossell | 307/360 |
| 4,424,458 | 1/1984 | Buck et al. | 307/361 |
| 4,443,787 | 4/1984 | Denk et al. | 307/360 |
| 4,529,892 | 7/1985 | Reilly et al. | 307/360 |
| 4,823,227 | 4/1989 | Grant | 307/360 |
| 4,859,872 | 8/1989 | Hyakutake | 307/360 |
| 5,196,937 | 3/1993 | Kageyama | 358/169 |

Primary Examiner—Timothy P. Callahan
Assistant Examiner—T. T. Lam
Attorney, Agent, or Firm—Max Fogiel

[57] ABSTRACT

An arrangement for monitoring an alternating signal with respect to its state as mark-to-space ratio or direct-current component, in which the alternating signal is modified so that its mark-to-space ratio or direct-current component can be detected by simple comparison with reference signals. Various information is then transmitted over a line, and the operation of the stage that generates the alternating signal can also be monitored.

8 Claims, 4 Drawing Sheets

METHOD AND APPARATUS FOR MONITORING AN ALTERNATING SIGNAL

BACKGROUND OF THE INVENTION

The present invention concerns a method of monitoring an alternating signal and a device therefor.

The use of stages that emit an alternating signal to control an adjoining stage is generally known. Such control stages can for example include a microprocessor that controls an adjoining stage by emitting an alternating digital signal. Oscillators that emit a sinusoidal, rectangular, or other alternating signal employed to process other signals in appropriate stages are also known.

There are various procedures for shaping the alternating signals deriving from such a control stage. Its potential can be shifted by imposing a constant potential onto it for example. It is also possible to vary its mark-to-space ratio. Such changes can be either intentional or symptomatic of errors in the control stage, depending on the equipment the stage is part of and on operation conditions.

SUMMARY OF THE INVENTION

The object of the present invention is a simple procedure for monitoring the state of an alternating signal.

Thus, an alternating signal generated by a control stage or oscillator for example is modified in accordance with the invention by comparing the modified signal with references in order to generate signals that are easy to interpret.

The alternating signal can be processed essentially by smoothing it. The result is employed as a measure for a possible constant-potential component and/or for the mark-to-space ratio of the alternating signal.

The alternating signal can alternatively be modified by forwarding it through a capacitor inserted between the stage that generates it and the stage it controls. The side of the capacitor that adjoins the second stage is charged by a source with prescribed potentials for a prescribed length of time when the potential at the side of the capacitor that adjoins the first stage, varies only slightly or not at all.

Both the alternating signals employed to control the second stage and the signals derived from them can be modified.

A change in the mark-to-space ratio and/or direct-current component of the alternating signal for example can be employed to control an adjoining stage or indicate a malfunction. A control stage of this type can operate wildly for example, with its output equivalent to a constant positive operating potential or to ground. This state can result for example by induction peaks affecting the program that controls the control stage. The stages adjoining the control stage will in this event begin to malfunction.

One advantage of the present invention is that such situations will easily be detected and the adjoining stage restored to its prescribed state.

Monitoring of this type can be employed in equipment that records and plays videotape for example.

BRIEF DESCRIPTION OF THE DRAWINGS

Further characteristics, advantages, and details of the present invention will be evident hereinafter. Embodiments of the invention will now be specified with reference to the accompanying drawing, wherein.

DESCRIPTION OF THE PREFERRED EMBODIMENTS

The figures are intended to illustrate the invention without limiting it in any way. Two or more blocks are often combined into single components that can be integrated or hybrid, that can constitute programmable microcomputers, or that can contribute to the program controlling them. Components of any stage can, however, also be realized as independent components.

Figure 1:
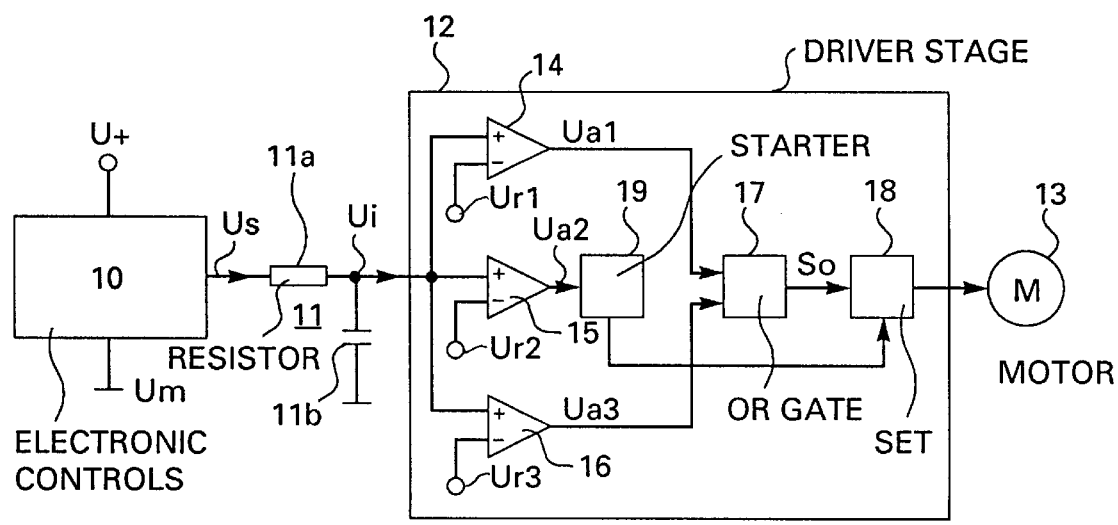
FIG. 1 is a block diagram of one embodiment of the invention, FIG. 2 comprises graphs of the signals associated with the embodiment illustrated in FIG. 1.

The electronic controls 10 illustrated in FIG. 1 emits a control signal Us to an driver stage 12 by way of a processing stage. Driver stage 12 powers a motor 13. The processing stage in the present embodiment is a smoothing component 11 and comprises a resistor 11a and a capacitor 11b. One contact of resistor 11a is connected to the output terminal of controls 10. Capacitor 11b is positioned between the second contact of resistor 11a and ground. Component 11 smoothes control signal Us into a signal Ui. Smooth signal Ui is forwarded to the non-inverting (+) input terminals of three comparators 14, 15, and 16. The inverting (−) input terminals of comparators 14, 15, and 16 are connected to three sources of reference potential Ur1, Ur2 and Ur3. The signal Ua1 leaving comparator 14 is forwarded to one input terminal and the signal Ua3 leaving comparator 16 to the other input terminal of an exclusive OR gate 17. The signal So leaving OR gate 17 is supplied to a set 18 of components that power motor 13 Set. Set 18 contains both an output section and means that process signal So and another signal Ss obtained from a starter 19 and operate the output section as specified hereinafter. The signal Ua2 leaving comparator 16 is forwarded to starter 19. The signal Ss leaving starter 19 is forwarded to set 18.

Figure 2:
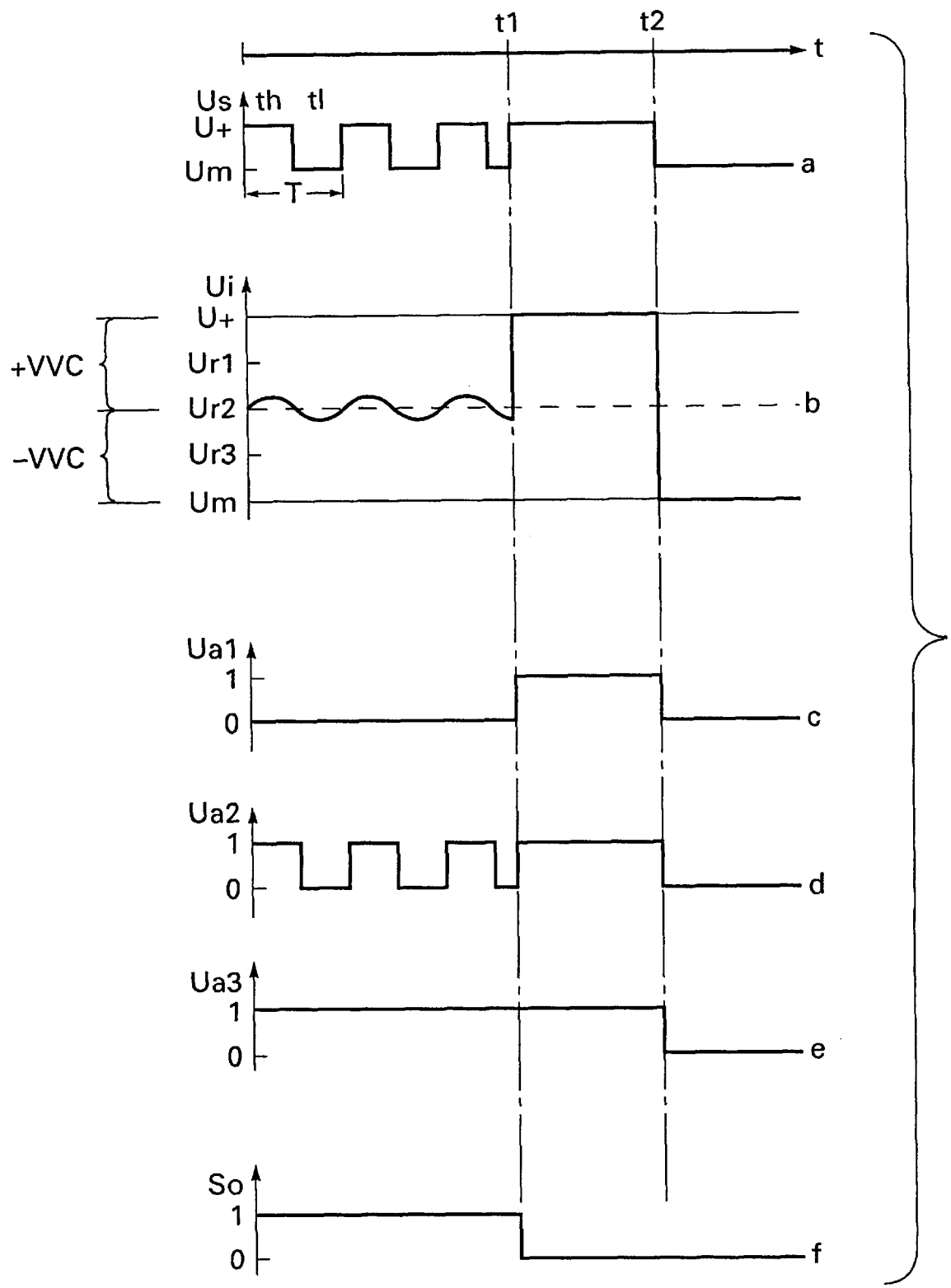

The operations of the embodiment illustrated in FIG. 1 will now be specified with reference to FIG. 2 but only to the extent necessary for comprehension of the present invention.

Controls 10 start motor 13 by emitting a pulsed control signal Us. Control signal Us is smoothed into a signal Ui during time t0 to t1 as illustrated in FIGS. 2a and 2b. Smooth signal Ui exhibits a residual undulation that has been exaggerated for the sake of illustration in FIG. 2. Reference potential Ur is also illustrated in FIG. 2b. The comparators emit the signals Ua illustrated in FIGS. 2c through 2e.

The normal operations occurring between times t0 and t1 will now be discussed. Smooth signal Ui causes comparator 15 to construct an outgoing signal Ua2 at a rate corresponding to that of the original control signal Us at a mark-to-space ratio th/tl for a period T. Signal Ua1 is low, meaning that it assumes the digital value 0, and outgoing signal Ua2 is high, assuming the digital value 1. As will be evident from FIG. 2f accordingly, the signal So leaving OR gate 17 will be high, and the operation of the output section will not be affected.

The control signal Us in this embodiment not only starts the motor but also monitors the operation of controls 10. If the controls begin to malfunction and the operating potential assumes a level that can in the present example be U+ or ground, the state of the signal So from OR gate 17 will change along with the action of the output section in set 18.

A malfunction that might occur during the period between times t1 and t2 with control signal Us assuming the form of a positive operating potential U+ will now be discussed. Outgoing signal Ua2 is high. Since operating potential U+ is higher than either Ur1 or Ur3, the latter two signals will, along with the signal So from OR gate 17 become low. Set 18 will decrease the speed of motor 13 from instantaneous to standby. The standby can be the OFF state for example.

Another possible malfunction is represented above time t2. Signals Us and Ui are at ground. Since this is below the level of both Ur1 and Ur2, the latter two will be low. Signal So will accordingly also be low, and the standby state will continue.

The situations illustrated in FIG. 2 are special in that the first malfunction occurs (t1–t2) before the second (after t2). It is of course also possible for smooth signal Ui to drop to ground potential subsequent to normal operation. In this event, the standby state will be initiated by slowing motor 13 down.

It has been assumed in specifying the foregoing embodiment that control signal Us will be detected between the two levels U+ and Um of the operating potential. It is, however, also possible not to lift control signal Us as high. The circuitry illustrated in FIG. 1 can in this event also be employed to establish a possible constant-voltage component for control signal Us.

Figure 3:
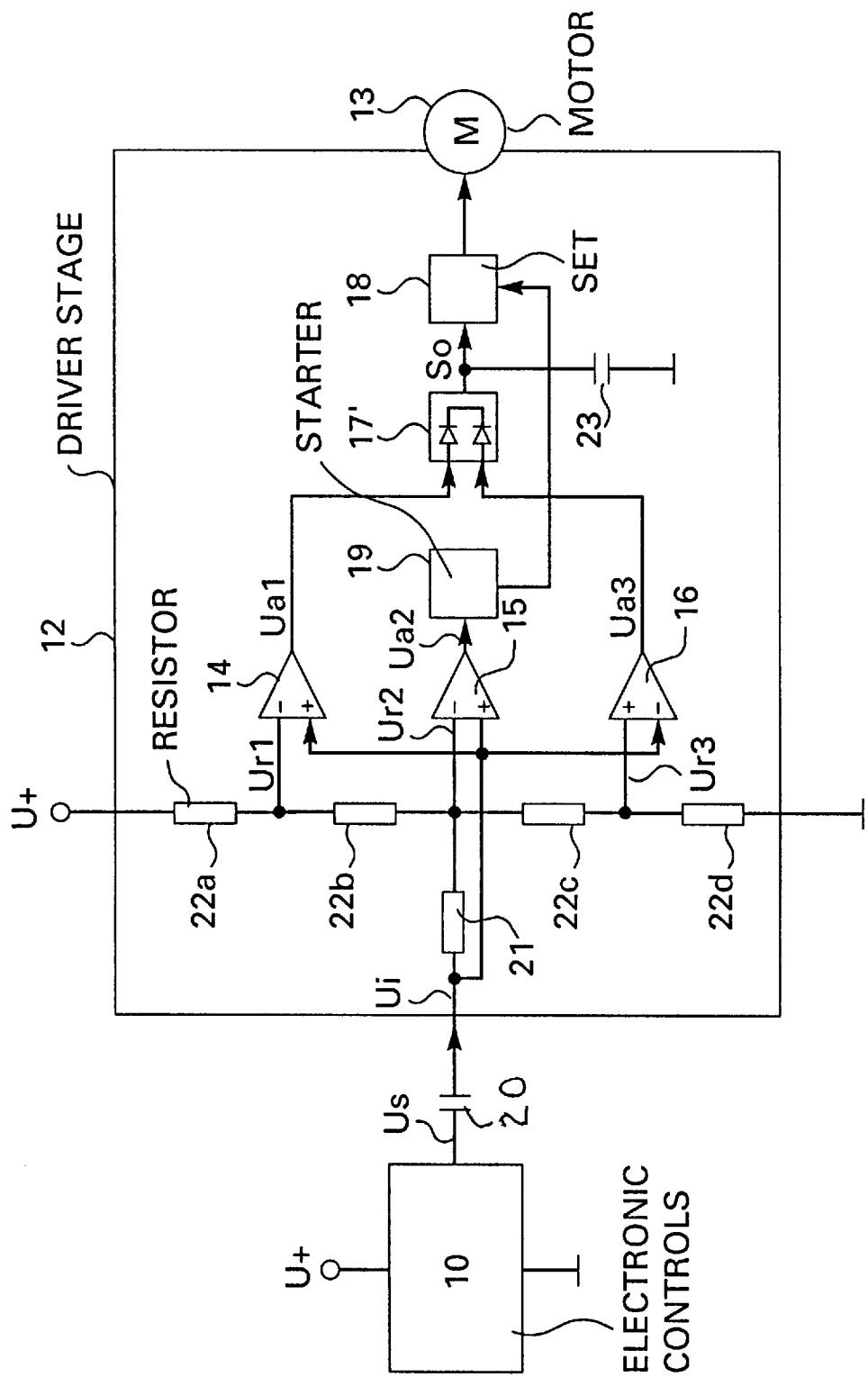
FIG. 3 is a block diagram of another embodiment of the invention, and FIG. 4 comprises graphs of the signals associated with the embodiment illustrated in FIG. 3.
Figure 4:
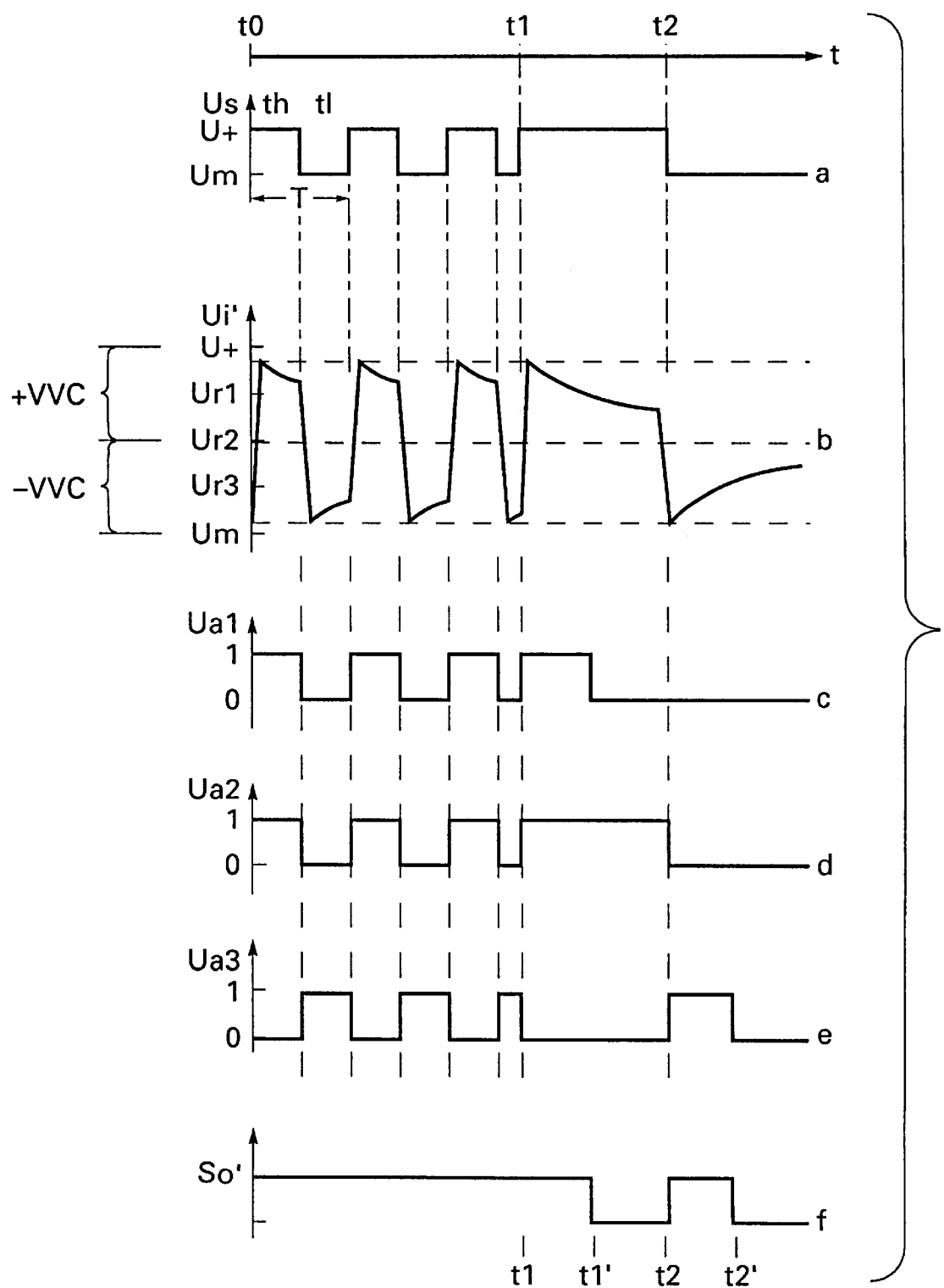

FIG. 3 is a block diagram of another embodiment that will now be specified with reference to FIG. 4. Components and signals similar to those specified with reference to FIGS. 1 and 2 are similarly labeled and will be specified only to the extent necessary for comprehension.

The major difference between the embodiment illustrated in FIG. 1 and that illustrated in FIG. 3 is in the processing of control signal Us. The signal is modified by a capacitor 20 instead of a smoothing component. Capacitor 20 is in series with a resistor 21. A signal Ui' is obtained at the junction between capacitor 20 and resistor 21 and forwarded to comparators 14, 15, and 16. Signal Ui' arrives at the non-inverting input terminals of comparators 14 and 15 and at the inverting input terminal of comparator 16. Resistor 21 is connected to the middle contact of a voltage divider 22 comprising resistors 22a, 22b, 22c, and 22d. Voltage divider 22 generates reference potentials Ur1, Ur2 and Ur3 at the free input terminals of comparators 14, 15, and 16. Outgoing signals Ua1 and Ua3 are forwarded to an either inclusive or exclusive OR gate 17'. The OR gate 17' in one preferred version of the invention comprises two diodes, one downstream of each comparators 14 and 16. The diodes are indicated inside the block that represents the gate in FIG. 3.

Downstream of OR gate 17' is a capacitor 23 that prevents signal So from being apparent to set 18 when it is forwarded briefly to it.

FIGS. 4a and 4b illustrates control signal Us and modified signal Ui'. When control signal Us change from low to high, the downstream side of the capacitor 20 illustrated in FIG. 3, the side that emits signal Ui', that is, discharges within a limited period, only approximately irregularly, that is, to a level of potential in the vicinity of the positive potential U+ powering controls 10. As long as control signal Us remains high, the downstream side of the capacitor will discharge exponentially by way of resistor 21 toward the reference potential Ur2 at the middle contact of voltage divider 22.

The characteristics of capacitor 20 and resistor 21 ensure that signal Ui' will not exceed first reference level Ur1 or third reference level Ur3 during the periods th and tl when control signal Us is always high or low in normal operation. Thus, first outgoing signal Ua1 will always be high (FIG. 2c) and third outgoing signal Ua3 will always be low (FIG. 2e) during period th.

The vertical dot-and-dash auxiliary lines in FIG. 4 indicate when the state of control signal Us is changing. The broken lines indicate when signal Ui' exceeds or does not attain second reference potential Ur2 and when the state of outgoing signal Ua2 is according changing. Gate-penetration times are ignored.

Signal Ui' will drop at a limited speed to approximately the level of ground potential Um while control signal Us is changing from high to low. The exponential potential at the downstream side of the capacitor again tends toward second reference potential Ur2, although third reference potential Ur3 is never exceeded in normal operation.

The signals Ui' illustrated in FIG. 2b during period t0 to t1 ensure that one of the outgoing signals Ua1 and Ua2 is always high when the impossibility of ensuring that signal Ui' will follow a irregularity in control signal Us rapidly enough is initially ignored. The signal So leaving OR gate 17 will accordingly be high in normal operation. Since, on the other hand, signal Ui' will as hereintofore indicated increase and decrease only at a limited speed, brief losses in the signal are to be expected. These will, however, be smoothed out by capacitor 23 to the extent that they will not be detected by set 18, and the irregularities illustrated in FIG. 4f will not need to be taken into consideration.

OR gate 17' should be designed to prevent capacitor 23 from discharging during the brief losses in the signal leaving the gate. The gate can for example comprise the two diodes illustrated in FIG. 3. It is also possible to employ another type of OR gate, a TTL for instance. In this event it may be necessary to insert another diode between the gate's output terminal and capacitor 23.

When the system leaves normal operation at a time t1 with control signal Us assuming a constant high level, the exponential voltage drop at the right side of the capacitor will prevent attainment of first reference potential Ur1 at time t1'. Both third outgoing signal Ua3 and first outgoing signal Ua1 will immediately shift to low and accordingly OR-gate outgoing signal So as well. The situation will be detected by set 18, which will start its component output section and lower the speed of motor 13 to standby.

In the event of a malfunction during which control signal Us assumes its intended constant ground potential as of time t2, signal Ui' will initially drop below the levels of first and third reference potentials Ur1 and Ur3, whereby OR-gate outgoing signal So will briefly simulate normal operations. As of time t2' on the other hand, the voltage will exceed third reference potential Ur3 and a malfunction will be detected.

The particular advantage of the embodiment illustrated in FIG. 2 over the embodiment illustrated in FIG. 1 is that operations can be reliably monitored even when controls 10 and driver stage 12 are operating at different potentials U+ and U+'. When second reference potential Ur2 is 2.5 volts and first and third reference potentials Ur1 and Ur3 are equidistant above and below it, the system illustrated in FIG. 1 will malfunction when controls 10 are operating at a potential U+ of either 2 or 10 volts and a control signal Us between potential U+ and ground is detected. The system illustrated in FIG. 1, but not the system illustrated in FIG. 3, can also be expected to malfunction at even slighter discrepancies.

The right side of the capacitor in the embodiment illustrated in FIG. 3 can be charged by a variable source of electricity. This source can for example be switched in directly between the right side of the capacitor and either a source of operating potential, potential U+' for instance, or ground and can be controlled by a comparison signal that functions as a measure of the difference between the potential at the right side of the capacitor and a reference potential like second reference potential Ur2 for example. A desired level of potential over time can be established at the right side of capacitor in terms of the source of electricity and the aforesaid comparison signal. This level can be an exponential, linear, or other function.

The foregoing embodiments can also feature one or more of the characteristics that will now be specified.

Control signal Us can be divided into a signal that drives set 18 and can be forwarded directly to it and another signal that monitors alternating signal Us. This version, although it does not need a capacitor, requires an additional line to driver stage 12.

Appropriate selection of reference potentials Ur can make it possible to detect when the potential of control signal Us is constant and to indicate deficits and excesses in prescribed detection procedures.

There can be more than three reference potentials. This feature will make it possible to detect corresponding direct-current components, whereafter additional operations in driver stage 12 can be immediately initiated over only one connection. When control signal Us is pulse-width modulated, it will also be possible to detect corresponding mark-to-space ratios in accordance with the number of reference potentials. This feature will make it possible to monitor the operations of such a load as motor 13. See in particular the prior German Applications P 4 227 761.2, which specifies how to determine the parameters of a current that drives a pulse-width modulated load, and P 4 229 344.8, which discloses a load controlled in accordance with temperature.

When a malfunction followed by normal operation is detected, set 18 can automatically restore such a downstream load as motor 13 to normal operation. This action can otherwise occur only upon receipt of confirmation emitted by unillustrated components or by the user of the system being monitored.

The foregoing embodiments can be employed in a videotape recorder, compact-disk player, or other equipment with a motor.

The operations of equipment and systems that do not include motors can also be monitored as specified herein.

In addition to monitoring operations, the present invention can also be employed to vary them. Control signals can be transformed into signals that can be utilized to control other operations.

We claim:

1. A method for monitoring an alternating signal comprising the steps of: modifying said alternating signal into a modified signal having characteristics over time that are a measure for a mark-to-space ratio and/or for a direct-current component present in said alternating signal; comparing said modified signal with reference signals and results establishing said mark-to-space ratio and/or direct-current component of said alternating signal; constructing a control signal from said results of said comparing step, said control signal being a measure of a potential malfunction when said mark-to-space ratio exceeds a given value and/or said direct-current component of said alternating signal is outside specifically given values; an alternating signal controls means having activities decreased to standby in response to said results of said comparing step.

2. A method as defined in claim 1, wherein said alternating signal is modified by smoothing said alternating signal into a signal with a direct-current component that is a measure for said mark-to-space ratio and/or direct-current component of said alternating signal and can have a variable-voltage component inside a specific range with a specifically given amplitude, said alternating signal being regeneratable in form of a signal from said variable-voltage component.

3. A method as defined in claim 1, wherein said alternating signal is modified by deriving a signal from said alternating signal and imposing on the derived signal a potential such that the derived signal will tend toward a specific level for a prescribed period when the potential of said alternating signal varies.

4. An arrangement for monitoring an alternating signal comprising: means for generating said alternating signal; a processing stage for modifying said alternating signal into a modified signal with characteristics over time that are a measure for a mark-to-space ratio and/or for a direct-current component present in said alternating signal; means comparing said modified signal with reference signals and results establishing said mark-to-space ratio and/or direct-current component of the alternating signal; evaluation means for constructing a control signal from said results of said comparing means, said control signal being a measure of potential malfunction when said mark-to-space ratio and/or said direct-component of said alternating signal are outside specifically given values.

5. An arrangement as defined in claim 4, wherein said processing stage includes means for smoothing said alternating signal into a signal having a direct-current component that is a measure for said mark-to-space ratio and/or direct-current component of said alternating signal and can have a variable-voltage component inside a specific range with a prescribed amplitude, said alternating signal being regeneratable in form of a signal from said variable-voltage component.

6. An arrangement as defined in claim 4, wherein said processing stage has a capacitor having a first contact connected to said generating means; a potential or current section charging or discharging a second contact of said capacitor with a prescribed current for generating a modified signal that tends toward a prescribed level for a prescribed period when the potential of the alternating signal varies.

7. An arrangement as defined in claim 4, including means controlled by a starter signal and said control signal and having activities decreasing to standby in response to said results of said comparing means.

8. A method for monitoring an alternating signal comprising the steps of: modifying said alternating signal into a modified signal having characteristics over time that are a measure for a mark-to-space ratio and/or for a direct-current component present in said alternating signal; comparing said modified signal with reference signals and results establishing said mark-to-space ratio and/or direct-current component of said alternating signal; constructing a control signal from said results of said comparing step, said control signal being a measure of a potential malfunction when said mark-to-space ratio exceeds a given value and/or said direct-current component of said alternating signal are outside specifically given values, said alternating signal being modified by smoothing said alternating signal into a signal with a direct-current component that is a measure for said mark-to-space ratio and/or direct-current component of said alternating signal and can have a variable-voltage component inside a specific range with a specifically given amplitude, said alternating signal being regeneratable in form of a signal from said variable-voltage component, said alternating signal being further modified by deriving a signal from said alternating signal and imposing on the derived signal a potential such that the derived signal will tend toward a specific level for a prescribed period when the potential of said alternating signal varies, said alternating signal controls means having activities decreased to standby in response to said results of the comparison step.

* * * * *